United States Patent [19]
Jovanovic

[11] Patent Number: 5,378,872
[45] Date of Patent: Jan. 3, 1995

[54] INFRARED APPARATUS FOR BAKING PASTRIES AND PIZZAS

[76] Inventor: Dragomir Jovanovic, 6, impasse Jean Moulin, 38000 Pont de Claix (Isere), France

[21] Appl. No.: 967,069

[22] Filed: Oct. 28, 1992

[30] Foreign Application Priority Data

Oct. 30, 1991 [FR] France .................. 91 13763

[51] Int. Cl.⁶ .................. F27B 9/06; F27B 9/16
[52] U.S. Cl. .................. 219/388; 219/405; 219/411; 392/416
[58] Field of Search .............. 219/388, 405, 411; 392/416, 418, 427; 84/97; 198/803.16; 99/443 R, 443 C; 338/217, 218, 236, 223

[56] References Cited

U.S. PATENT DOCUMENTS

| | | | |
|---|---|---|---|
| 500,371 | 6/1893 | Brachhausen | 84/97 |
| 3,559,564 | 2/1971 | Turner | 219/388 |
| 3,735,692 | 5/1973 | Marchignoni | 99/443 C |
| 4,363,955 | 12/1982 | Gauthier | 219/388 |
| 4,538,050 | 8/1985 | Willett | 219/388 |
| 4,886,948 | 12/1989 | Pomroy | 99/443 R |
| 4,960,977 | 10/1990 | Alden | 219/388 |
| 5,113,753 | 5/1992 | Robinson | 99/443 C |

FOREIGN PATENT DOCUMENTS

| | | |
|---|---|---|
| 0226407 | 6/1987 | European Pat. Off. . |
| 0236269 | 9/1987 | European Pat. Off. . |
| 53-130530 | 11/1978 | Japan | 219/552 |

Primary Examiner—Teresa J. Walberg
Attorney, Agent, or Firm—Oliff & Berridge

[57] ABSTRACT

An apparatus employing directed infrared radiation emitted by two spaced sources delimiting a baking space for a plate receiving food to be baked. The two sources are separated by a space of 5 to 10 centimeters. The lower source is preferably located less than one millimeter from the bottom of the support, which is constituted by a circular removable plate. The plate is supported and guided rotationally with respect to the floor of the apparatus and is made of an infrared-permeable material and cooperates by its periphery with a constant-speed positive rotational drive arrangement. The drive confers a sequential character on the strong radiation energy of the infrared sources.

7 Claims, 2 Drawing Sheets

INFRARED APPARATUS FOR BAKING PASTRIES AND PIZZAS

BACKGROUND OF THE INVENTION

The present invention relates to an infrared apparatus for baking biscuit-shaped foods such as pizzas, quiches, tarts, galettes, génoises, feuilleté pastries, and fougasses.

At the present time, such foods are baked in traditional gas ovens with infrared radiation, with or without swirling hot air, or in specialized ovens having a heating apparatus of the burner type or electrical resistances and a heat accumulation arrangement, in particular refractory materials.

Before baking and to bring the mass of refractory materials to the right temperature, most ovens require a preheating phase. The length of the preheating phase affects both the total baking time and the consumption of energy. Moreover, electric ovens require a high installed power which has a substantial impact on the investment outlay and operating cost.

Present-day ovens are large in size, either because they must be versatile to accommodate voluminous dishes or foods that rise when baked, or because, to accumulate heat energy, they have a large volume of refractory materials and/or insulating materials.

In ovens that have two sources of infrared radiation, namely an upper source and a lower source, located one on either side of a plate in a baking chamber, the sources of infrared radiation are constituted by hairpin-shaped shielded resistors with or without a central sine curve. The sources are located near the floor and the roof and may be disposed in for example reflecting-gutter-shaped parts as in EP-A 236,269. The plate on which the dish to be baked is placed cooperates with brackets projecting from lateral walls that allow the vertical level of the plate to be adjusted as a function of baking needs.

With this design, and when shallow foods such as galettes are to be baked, the distance between the upper surface of the food and the roof resistor is on the order of 10 to 20 cm. This has the effect of increasing heat loss by dissipation of energy into the air and of using the infrared radiation under poor conditions, since its heating power increases in proportion to its closeness to the food. As a result, at constant electric power, the heat supplied for baking is lowered and to achieve the desired degree of baking, the baking time and electricity consumption must be increased.

SUMMARY OF THE INVENTION

A goal of the present invention is to overcome the above-described disadvantages in the prior art by providing an apparatus specially designed to bake shallow biscuit-shaped foods that take up little space, which requires no preheating, and affords rapid, even baking with low installed power and low electricity consumption.

In this apparatus, the two infrared sources are separated by a space of between 5 and 10 centimeters and the lower source is located less than a millimeter from the bottom of a support. The support includes a circular removable plate which is supported and guided rotationally relative to the floor. The support is made of an infrared-permeable material and at its periphery cooperates with a constant-velocity positive rotational drive which confers a sequential nature on the strong radiation energy of the infrared sources.

With this arrangement, the food disposed in the baking space is subjected by the two infrared sources to radiation action whose strength, which would normally burn or scorch it at least at the surface, is compensated by the rotation of the plate. In addition to this sequential radiation action, the food is subjected to continuous steam cooking, resulting from absorption by the food of latent heat from the steam condensing thereon. The steam comes from evaporation under the action of radiation, first of the water contained in the food, then of the water droplets resulting from condensation of the steam on the food. The latent steam heat to the food. This evaporation-condensation cycle occurs more easily in proportion to the closeness of the upper source to the upper surface of the food and supplies high power per unit area as the space provided between the upper surface of the food and the roof of the baking space is small.

Because of this, and because of the elimination of preheating, the food baking time is cut in three and electricity consumption is cut in four.

In one embodiment of the invention, each of the infrared sources is designed to supply infrared radiation that increases from the middle of its length, corresponding to the center of the plate, up to each of its ends that extend beyond this plate.

This variation in radiation, combined with the rotation of the plate, delivers an even heat supply to the entire surface of the food, namely both to the center thereof, rotating at low speed, and to its periphery, rotating at a higher circumferential speed.

Advantageously, and to further improve the evenness of baking and prevent overbaking in the central part of the food, the upper and lower sources of infrared radiation are displaced transversely to either side of a vertical median plane passing through the diameter of the plate with which their respective lengthwise axes are parallel.

BRIEF DESCRIPTION OF THE DRAWINGS

Other characteristics and advantages will emerge from the description hereinbelow with reference to the attached schematic drawing showing as nonlimiting examples, two embodiments of this baking apparatus in which.

DETAILED DESCRIPTION OF PREFERRED EMBODIMENTS

Figure 1:
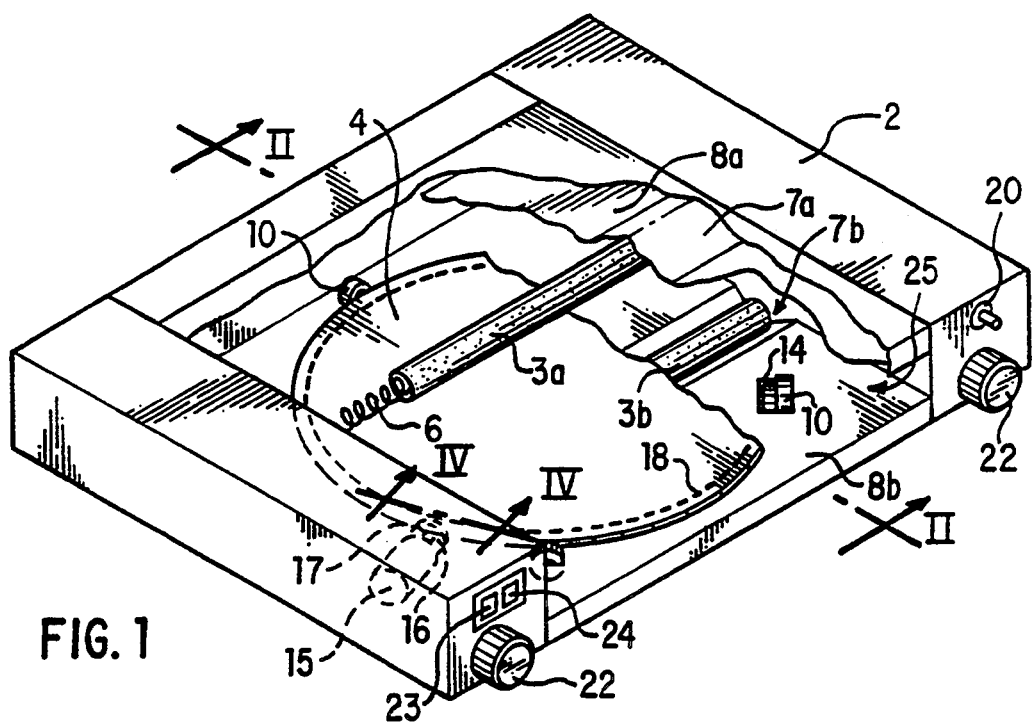
FIG. 1 is a partially sectioned perspective view showing the relative positions of the various components of a first embodiment of the present invention.
Figure 2:
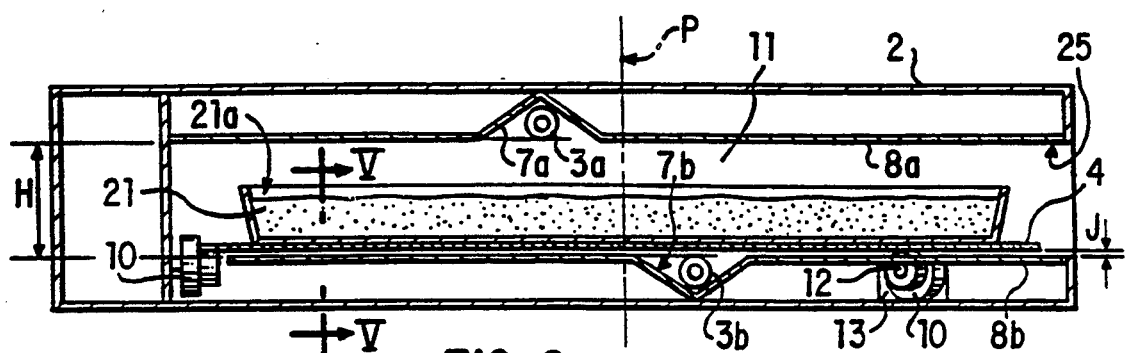
FIG. 2 is a cross section along line II—II in FIG. 1.

As shown in FIGS. 1 and 2, the baking apparatus is composed of a metal casing 2 forming a frame and supporting two infrared sources 3a, 3b delimiting a baking space 11 and located one on either side of a removable, circular, rotating plate 4. Plate 4 is made of an infrared-permeable material, particularly of glass-ceramic.

Figure 5:
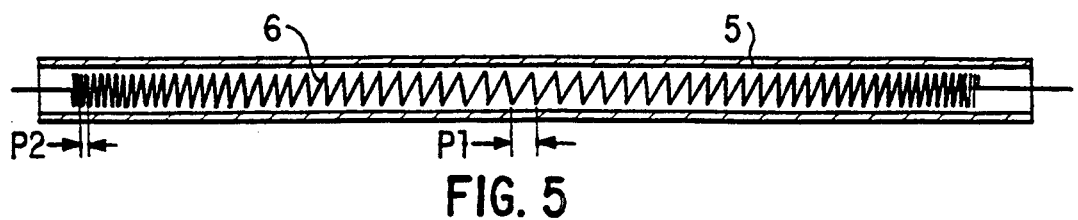
FIG. 5 is a side view in lengthwise section showing one embodiment of the infrared source on an enlarged scale.

Each of infrared sources 3a, 3b is composed, as shown in greater detail in FIG. 5, of a quartz cylindrical tube 5 containing a spiral-wound electrical resistor 6. This figure shows that the pitch of the turns of resistor 6 decreases from its midpoint to its ends from a value P1 to a value P2 such as to furnish energy at a particular point whose value increases from the middle of this resistor up to each of its ends.

In one alternative embodiment not shown, each resistor 6 is formed of sections each of which has a constant spiral pitch, and the various sections have pitches that decrease from the center section to the end sections.

FIGS. 1 and 2 show that the two resistors, whose ends extend beyond plate 4, are located one on each side of this plate 4, parallel to one diameter thereof and to either side of a vertical plane P passing through this diameter. Thus, when plate 4 rotates, each individual zone of the food placed thereon is sequentially subjected to the heating power of the resistors at regular time intervals.

Each of the two sources 3a, 3b is disposed in a reflecting gutter 7a, 7b with a generally V-shaped cross section whose concave side faces the opposite gutter. These gutters are provided in metal walls that constitute roof 8a and floor 8b of the apparatus, respectively.

Plate 4 is kept in the immediate vicinity of lower sources 3b, from which it is separated by a distance J preferably of between 0.5 and 1 millimeter, by means which, in the embodiment shown, are constituted by stepped rollers 10, preferably three in number and 120° apart.

Figure 3:
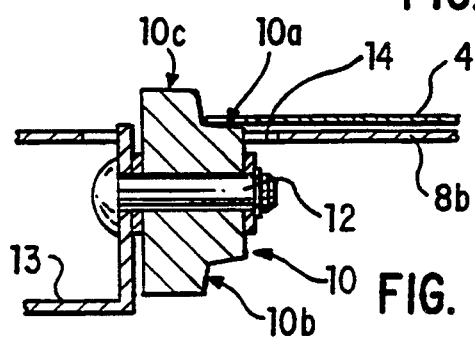
FIG. 3 is a partial sectional view along line III—III in FIG. 2 showing the holding and guiding means at the top of the plate.
Figure 4:
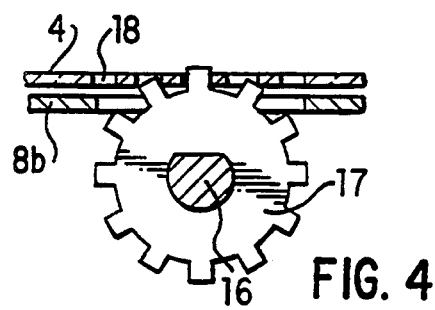
FIG. 4 is a partial sectional view along line IV—IV in FIG. 1 showing, on an enlarged scale, one embodiment of the means for driving the plate.

As shown in greater detail in FIG. 3, each of the rollers is mounted rotationally freely on a pivot 12 whose lengthwise axis is substantially radial relative to the plate. Pivot 12 rests on a bearing 13 connected to the lower part of frame 2. The upper part of each roller 10 passes through an opening 14 in floor 8b. The small-diameter part 10a of each roller 10 extends beyond floor 8b by a value that determines the space between the bottom of plate 4 and floor 8b, and constitutes a support point for the peripheral edge of plate 4. Shoulder 10c is disposed relative to the center of plate 4 and such that its diametral face 10b of shoulder 10c of the roller constitutes a stop face that prevents any translational movement of plate 4.

It can easily be seen that when the plate is driven rotationally, the rollers provide support and rotational guidance of plate 4 without resisting its removal for cleaning for example.

According to one essential characteristic of the invention, source 3a is also located near to but without contacting the upper surface 21a of food 21 preferably by a distance of between 0.5 and 5 centimeters depending on the nature of the food. Because of this, to accommodate biscuit-shaped foods that have a maximum height of about 4 to 5 before baking the baking space 11 delimited between upper source 3a and lower source 3b has a height H preferably of between 5 and 10 centimeters according to the rated power of the resistors 6, and in practice is preferably about 6 centimeters. This distance, which is very small by comparison to that of present-day ovens, ensures baking of all foods in the shape of biscuits, and makes the most of the heat energy generated by sources 3a, 3b.

The rotational movement of plate 4 is generated by an electric motor 15 on the output shaft 16 of which a gear 17 is attached rotationally. Motor 15 is disposed between two rollers 10 and such that the lengthwise axis of its output shaft 16 is substantially radial relative to the center of rotation of plate 4. Gear 17 meshes with teeth 18 provided at the periphery of plate 4 and composed either of teeth located under the lower surface of plate 4 or by teeth cut out of plate 4.

In an alternative embodiment, not shown, the teeth are made in or located under a metal crown placed between glass-ceramic plate 4 and rollers 10.

The electrical circuit that powers motor 15 and sources 3a, 3b has a timer 20 for setting baking times and has a setting means 22 of the rheostat or other type to set the heat dissipated by the sources an on-off button 23 with a pilot light 24. Preferably, the circuit also has a safety means to cut off the power to sources 3a, 3b if the electric motor should fail or cut out, to prevent the heat from sources 3a, 3b from burning the food locally during baking.

Figure 6:
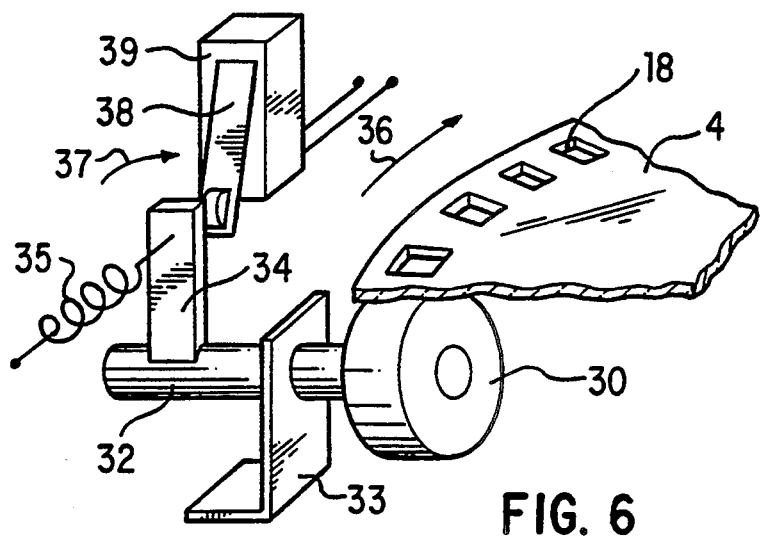
FIG. 6 is a partial perspective view of one embodiment of safety means for cutting off the power to the infrared sources.

In the embodiment shown in FIG. 6, the safety means comprises a wiper 30 made of a synthetic material with a low friction coefficient. Wiper 30 is held in sliding contact with the lower peripheral edge of plate 4 and is integral with a radial pin 32 pivotably mounted in a fixed bearing 33. At its other end, pin 32 is integral with a lever 34 urged in the resting position by a spring 35.

When the plate 4 rotates in the direction of arrow 36, it slides on wiper 30 causing lever 34 to pivot in the direction of arrow 37 until it rests on tongue 38 of a contactor 39 disposed on the electrical circuit that powers sources 3a, 3b. As soon as plate 4 is no longer being driven rotationally, and whatever the reason for the interruption, spring 35 returns lever 34 to the resting position more easily because wiper 30 is subjected to only a low resistance force. As a result, tongue 38 of contactor 39 is released causing contactor 39 to switch off the power to sources 3a, 3b.

This simple, inexpensive, and reliable device also prevents deterioration in the apparatus, particularly reflecting gutters 7a, 7b, caused by the fumes given off by food 21, should rotation be interrupted unintentionally.

An opening 25 is provided on the front face of the oven to allow introduction and extraction of the food. Opening 25 can be closed by a door, although this is not essential in view of the transversal layout of the sources and the use of their radiation in the immediate vicinity of their emission, namely under conditions that reduce heat losses to the sides. Likewise, the presence of opening 25 does not favor escape of steam created in baking chamber 11, since this steam tends to condense on the food as long as the food temperature is lower than the steam temperature.

It can be seen that all biscuit-shaped or shallow foods can be baked very easily and quickly in this apparatus by the two sources 3a, 3b, being disposed in the immediate vicinity of the substance to be baked where the strength of their infrared radiation is compensated by rotation of the plate. Because of the variable pitch of each of the resistors, the radiation of each is adapted locally to the circumferential speed of the facing zone of the plate, so that the food is evenly baked through.

Because of this design, and because of the absence of substances accumulating energy such as refractory materials, the installed electric power is one-third that of a traditional electric oven, while consumption is cut in four. The consumption is also reduced by the absence of preheating and the instant nature of infrared emission, as soon as each resistor is powered.

FIGS. 1 and 2 show that, by comparison to a traditional oven, the apparatus calls on far fewer resources and is hence inexpensive and compact, so that it can easily be built into a piece of kitchen furniture.

It must be pointed out that, abiding by current codes for kitchen fittings, it is possible to make a baking unit that can accept tart or pizza dishes up to a diameter of 35 cm and which itself has a width of 50 cm, a height of 10 cm, and a depth of 45 cm, as a general size. With resistors 6 of 500 watts each, this apparatus allows a tart to be baked in 15 minutes and a pizza in 10 minutes.

Other advantages of the above described structure are the ease of maintenance leading to easy clean-ups and the possibility of superimposing several identical units in a professional facility.

The apparatus described above in the case of its application to baking biscuit-shaped foods can also be used to defrost or reheat all foods shallow in shape, in any event less than the height of the baking chamber of this apparatus.

Figure 7:
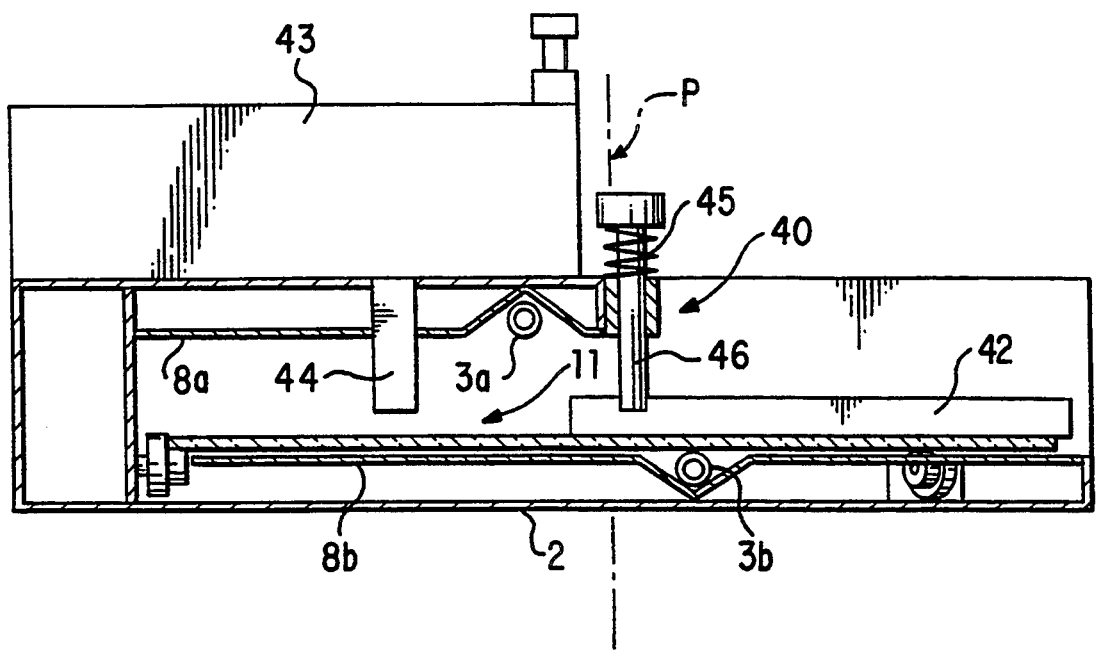
FIG. 7 is a view similar to FIG. 2 showing an embodiment of this apparatus in the case of its application to making crepes.

The embodiment shown in FIG. 7 represents an alternate embodiment of the present invention which may be used to bake crepes. It differs from that described in the previous embodiment by the fact that roof 8a and the upper part of frame 2 have a front cutaway for access to plate 4, which extends essentially up to half the depth of baking chamber 11. This cutaway is easier to provide because sources 3a and 3b are disposed transversely and upper sources 3a is further to the rear.

In this figure, reference numeral 42 designates a spreader extending from the center to the periphery of plate 4 allowing a quantity of batter to be spread over the plate. The batter is dispensed by a metering dispenser 43 through a tube 44 terminating above the plate.

When a metered amount of batter has been poured onto plate 4 and distributed by spreader 42, spring 45 associated with rod 46 on which the spreader is mounted pulls spreader 42 back up thus avoiding any friction that would impede rotation of the plate. When the crepe is cooked, which is very easy to ascertain by viewing it through cutaway 40 in the frame, the operator slides a spatula between the crepe and the plate and uses the rotational movement of the plate to remove the crepe from the plate.

In this particular application, the height of baking chamber 11 can be reduced still further for optimum utilization of the radiation energy which, for the same power per unit area, allows lower-powered, less expensive, and less power-consuming resistors 6 to be used.

In one embodiment not shown, the assembly of floor 8b with lower infrared source 3b, plate 4, and its guide means 10, drive means 15, 16, 17, and safety means 30, 38, 39, is disposed in a frame that can slide in the apparatus in the manner of a drawer to facilitate cleaning and maintenance. The drawer arrangement also facilitates placement of the food on the plate and its removal after baking.

It is obvious that the invention also extends to devices with equivalent means such as plate guide means composed of stepped, fixed supporting surfaces made of sliding refractory material or rotational drive means using friction rollers.

I claim:

1. An apparatus for baking flat foods, comprising:
   an upper and a lower rectilinear source of infrared radiation, said sources being separated by a space between 5 and 10 cm;
   a support means for supporting the food to be baked, said support means being a rotatably supported removable plate disposed between said upper and lower sources, wherein said plate is made of an infrared-permeable material and is disposed less than 1 mm above said lower source, wherein said upper and lower infrared radiation sources are displaced on either side of a median vertical plane passing through the plate diameter with which their respective lengthwise axes are parallel, and wherein each of said infrared sources is designed to furnish infrared radiation that increases starting from its midpoint out to each of its ends extending beyond the plate;
   a constant speed positive rotational drive means for rotating said plate thereby conferring a sequential character on the infrared source radiation energy; and
   a roof and a floor, said upper and lower sources being disposed between said roof and said floor in reflecting gutters respectively provided in said roof and said floor.

2. The apparatus according to claim 1, wherein said plate is rotatably supported by a plurality of stepped rollers having first and second stepped surfaces, said rollers adapted to freely rotate about axes that are horizontal and radial relative to said plate, said axes being spaced angularly and supported by fixed bearings each of said rollers being disposed such that said first stepped surface is arranged above said floor by said predetermined distance and said second stepped surface is arranged radially outside of said first stepped surface and constitutes a stop for holding a peripheral edge of said plate, said plate resting on said first stepped surface.

3. The apparatus according to claim 1, wherein said drive means further comprises an electric motor having an output shaft disposed radially relative to the plate, and a gear attached to said output shaft cooperating with a plurality of circular teeth integral with a peripheral edge of said plate.

4. The apparatus according to claim 3, wherein said electric motor and said infrared radiation sources are connected to an electrical circuit comprising a timer, means for setting the radiation power of each of said sources, and safety means for switching off said sources if said electric motor fails.

5. The apparatus according to claim 4, wherein the safety means comprises a wiper in contact with the plate and integral with an oscillating lever, said lever being urged from a resting position towards a control tongue of a cutoff contactor by rotation of said plate, said lever being urged away from said control tongue by a return spring towards said resting position such that when rotation of said plate is interrupted, said spring causes said lever to return to said resting position releasing said control tongue from said cutoff contactor.

6. The apparatus according to claim 1, wherein said roof has a front cutaway for access to said plate, said cutaway extending essentially to half the depth of said plate.

7. The apparatus according to claim 1, wherein said lower infrared source, said plate, and said drive means are disposed on a frame forming a removable drawer.

* * * * *